(12) United States Patent
Chih et al.

(10) Patent No.: US 6,343,451 B1
(45) Date of Patent: Feb. 5, 2002

(54) STRUCTURE OF AN ASSEMBLY TYPE FLOOR, OR WALL TILE

(76) Inventors: Su Chin Chih; Chien Tien Te; Wu Pei Chun; Hsu Huang Tang, all of PO Box 82-144, Taipei (TW)

( * ) Notice: Subject to any disclaimer, the term of this patent is extended or adjusted under 35 U.S.C. 154(b) by 0 days.

(21) Appl. No.: 09/579,061

(22) Filed: May 26, 2000

(51) Int. Cl.$^7$ .................................................. E04F 13/08
(52) U.S. Cl. ............................. 52/390; 52/312; 52/385; 52/389
(58) Field of Search .......................... 52/390, 392, 385, 52/389, 312

(56) References Cited

U.S. PATENT DOCUMENTS

| | | | |
|---|---|---|---|
| 2,114,710 A | * | 4/1938 | Holcomb |
| 3,344,011 A | * | 9/1967 | Goozner |
| 3,878,030 A | * | 4/1975 | Cook |
| 5,362,560 A | * | 11/1994 | Ehrhart et al. |
| 5,590,500 A | * | 1/1997 | McCue |
| 5,916,102 A | * | 8/1999 | Peyton |
| 5,937,612 A | * | 8/1999 | Winer et al. |
| 6,073,408 A | * | 6/2000 | Winer et al. |

FOREIGN PATENT DOCUMENTS

GB 2075568 * 11/1981

* cited by examiner

Primary Examiner—Blair M. Johnson
(74) Attorney, Agent, or Firm—A & J

(57) ABSTRACT

An improved structure of an assembly type floor or wall tile includes a face layer of stone or wooden material, and a bottom layer of plastic, which are injection molded and bonded integrally so that they will not disengage, and the stone face layer is not vulnerable to breaking. Besides, the present invention has the features of dampness and fire resistance, material savings, reduced costs, lightness, and easy transport. Besides, the periphery of the bottom layer is provided with projecting and indented retaining posts, the bottom side thereof being formed with a plurality of grooves that have a circular, square or any suitable shape, and that are narrow at the opening and wide at the bottom. The retaining posts are for assembly purposes to facilitate construction and permit repair and replacement. The grooves in the bottom side has the effects of shock-absorbing, ventilation, reinforced structure, plastic material savings, and lightness. During laying out, cement or other bonding agent may be used to fill in the grooves to increase the bonding force to prevent disengagement.

1 Claim, 1 Drawing Sheet

STRUCTURE OF AN ASSEMBLY TYPE FLOOR, OR WALL TILE

BACKGROUND OF THE INVENTION (a) Field of the Invention

The present invention relates to an improved structure of an assembly type floor or wall tile.

(b) Description of the Prior Art

Conventional floor or wall tiles of marble or wood are formed from genuine materials of a considerable thickness, which is not only a waste of material when used in furnishing, they also have the disadvantages of heaviness, high material costs and transport costs, inconvenient construction, and difficult repair and replacement. For wooden floor or wall tiles, they are bonded by means of adhesives, and may become deformed due to improper bonding. For stone floor or wall tiles, they may be easily broken during transportation, and the bonding thereof may be affected by dampness coming up from the ground below, resulting in loosening or disengagement of the tiles. The above problems have to be overcome.

SUMMARY OF THE INVENTION

The object of the present invention is to provide an improved structure of an assembly type floor or wall tile to eliminate the drawbacks associated with the prior art. The assembly type floor or wall tile includes a face layer of stone or wooden material, and a bottom layer of plastic, which are injection molded and bonded integrally so that they will not disengage, and the stone face layer is not vulnerable to breaking. Besides, the present invention has the features of dampness and fire resistance, material savings, reduced costs, lightness, and easy transport. Besides, the periphery of the bottom layer is provided with projecting and indented retaining posts, the bottom side thereof being formed with a plurality of grooves that have a circular, square or any suitable shape, and that are narrow at the opening and wide at the bottom. The retaining posts are for assembly purposes to facilitate construction and permit repair and replacement. The grooves in the bottom side has the effects of shock-absorbing, ventilation, reinforced structure, plastic material savings, and lightness. During laying out, cement or other bonding agent may be used to fill in the grooves to increase the bonding force to prevent disengagement.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
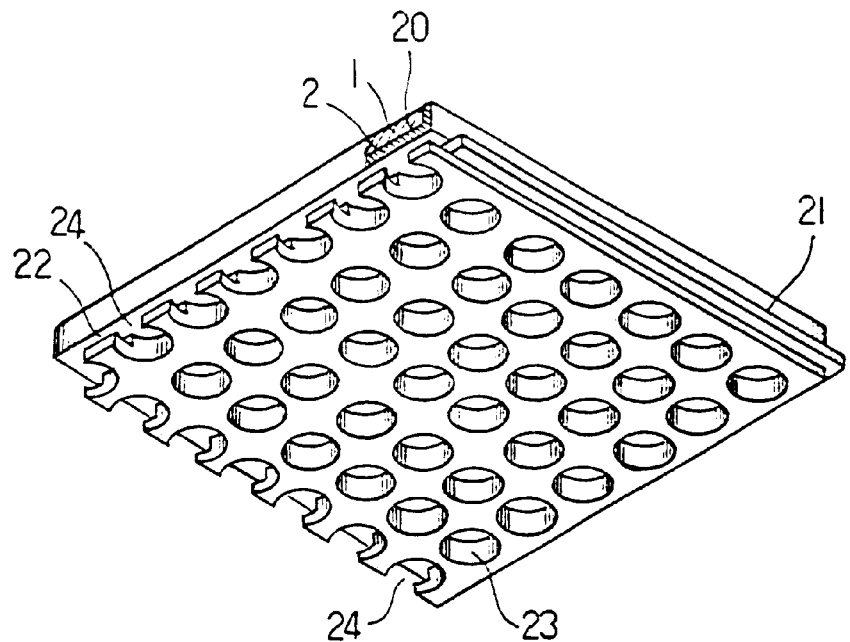
FIG. 1 is a perspective schematic view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
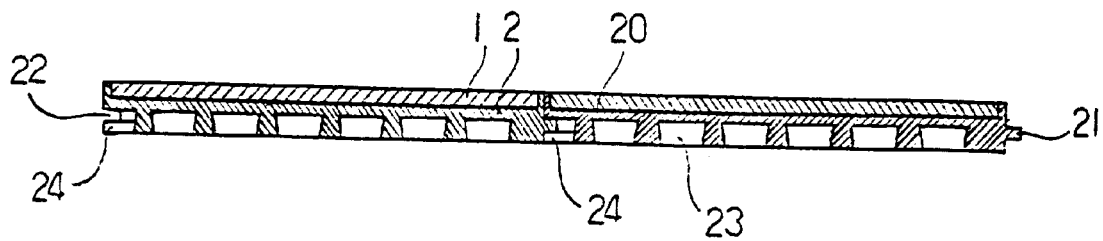
FIG. 2 is a schematic view illustrating assembly of the present invention.

With reference to FIGS. 1 and 2, the assembly type floor or wall tile of the present invention includes a face layer 1 and a bottom layer 2. The face layer is formed into a plate shape using marble or other stone material, or wood or other synthetic wooden material. The thickness is about 3–5 mm depending on needs. The bottom layer 2 is of plastic material. They are directly injection molded and coupled integrally. At the same time, the periphery of the face layer 1 is enclosed by the plastic material of the bottom layer 2. That is, the top side of the bottom layer is formed with a recessed face 20, and the face layer 1 is coupled inside the recessed face 20, which can not only increase the bonding force, the face layer will not become disengaged or broken when dropped. During laying out, the face layer can be completely isolated from the floor or wall surface to prevent dampening. Such has the advantages of material savings, reduced costs, lightness, convenient transport, and fire-resistance.

The periphery of the bottom layer 2 of the above-mentioned floor or wall tile is provided with projecting and indented retaining posts 21, 22, with a plurality of grooves 23 that have a circular, square or any suitable shape and that are narrow at the opening and wide at the bottom provided in the bottom side. The projecting and indented retaining projections 21, 22 are for assembly and installation use. This has the effects of convenient and quick construction, and permitting repair and replacement. The grooves 23 on the bottom side has the effects of shock-absorbing, ventilation, reinforced structure, plastic material savings, and lightness. During laying out, cement or other bonding agent may be used to fill in the grooves 23 to increase the bonding force so as to prevent disengagement.

The recesses 23 near the indented retaining posts 22 are provided with notches 24 communicated with the recessed retaining posts 22 so that the cement can enter the grooves 23 via the notches 24 during assembly so as to facilitate construction.

In sum, the assembly type floor or wall tile of the present invention utilizes stone material or wooden material as face layer, and plastic as bottom layer, and is directly injection molded and bonded integrally to achieve strong bonding, without the problem of disengagement. In addition, the projecting and indented retaining posts provided at the periphery of the bottom layer have grooves that are narrow at the opening and wide at the bottom provided on the bottom side. The present invention is novel and has the advantages of material savings, reduced costs, easy assembly and construction, increased cement bonding force, lightness, and convenient transport.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A structure of an assembly type floor or wall tile, comprising a face layer of wooden material having a thickness of 3–5 mm and a bottom layer of plastic material, wherein said face layer of wooden material and said bottom layer of plastic are injection molded and coupled integrally thereby causing periphery of said face layer to be enclosed by plastic material of said bottom layer, a top side of said bottom layer is formed with a recessed face adapted to receive said face layer, said periphery of said bottom layer is provided with projecting and indented retaining portions, said bottom layer is formed with a plurality of circular grooves which have a smaller diameter at an opening thereof, said grooves near said indented retaining portions are provided with notches communicated with said indented retaining portions thereby enabling cement to enter into said circular grooves via said notches during assembly so as to facilitate construction.

* * * * *